July 16, 1929.  P. L. J. B. LAMBERT  1,720,737
STEERING WHEEL
Filed April 12, 1926   6 Sheets-Sheet 5
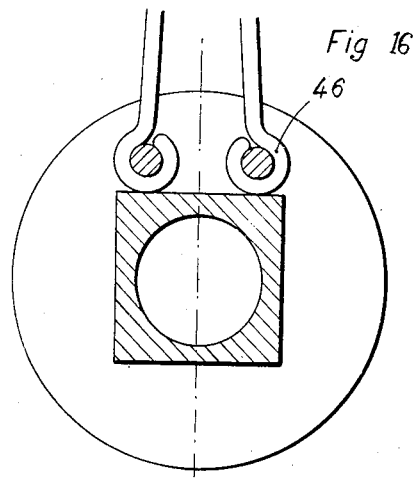
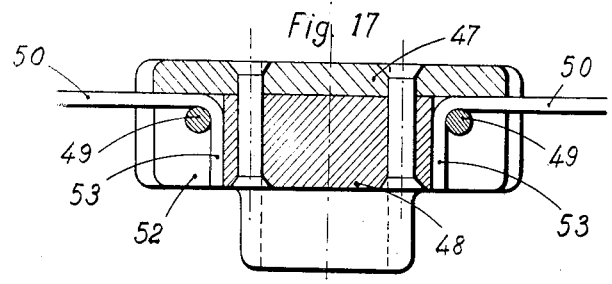
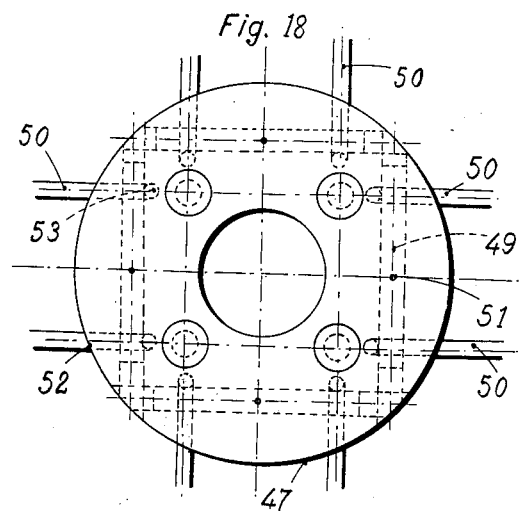
P. L. J. B. Lambert
INVENTOR
By: Marks & Clark
ATTYS July 16, 1929.  P. L. J. B. LAMBERT  1,720,737
STEERING WHEEL
Filed April 12, 1926  6 Sheets-Sheet 6
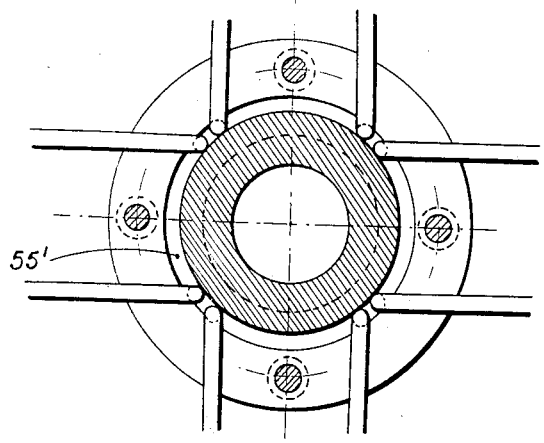
Fig. 21ª
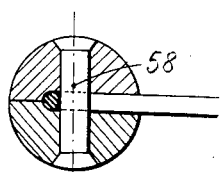
Fig. 22
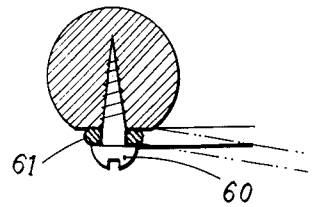
Fig. 24
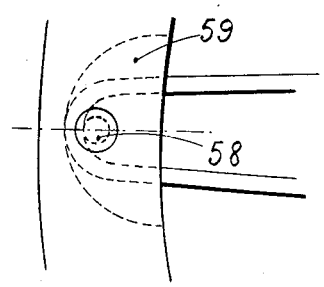
Fig. 23
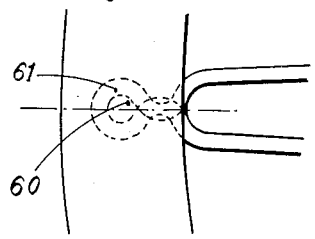
Fig. 25
P.L.J.B.Lambert
INVENTOR
By Marks & Clark
Attys Patented July 16, 1929.

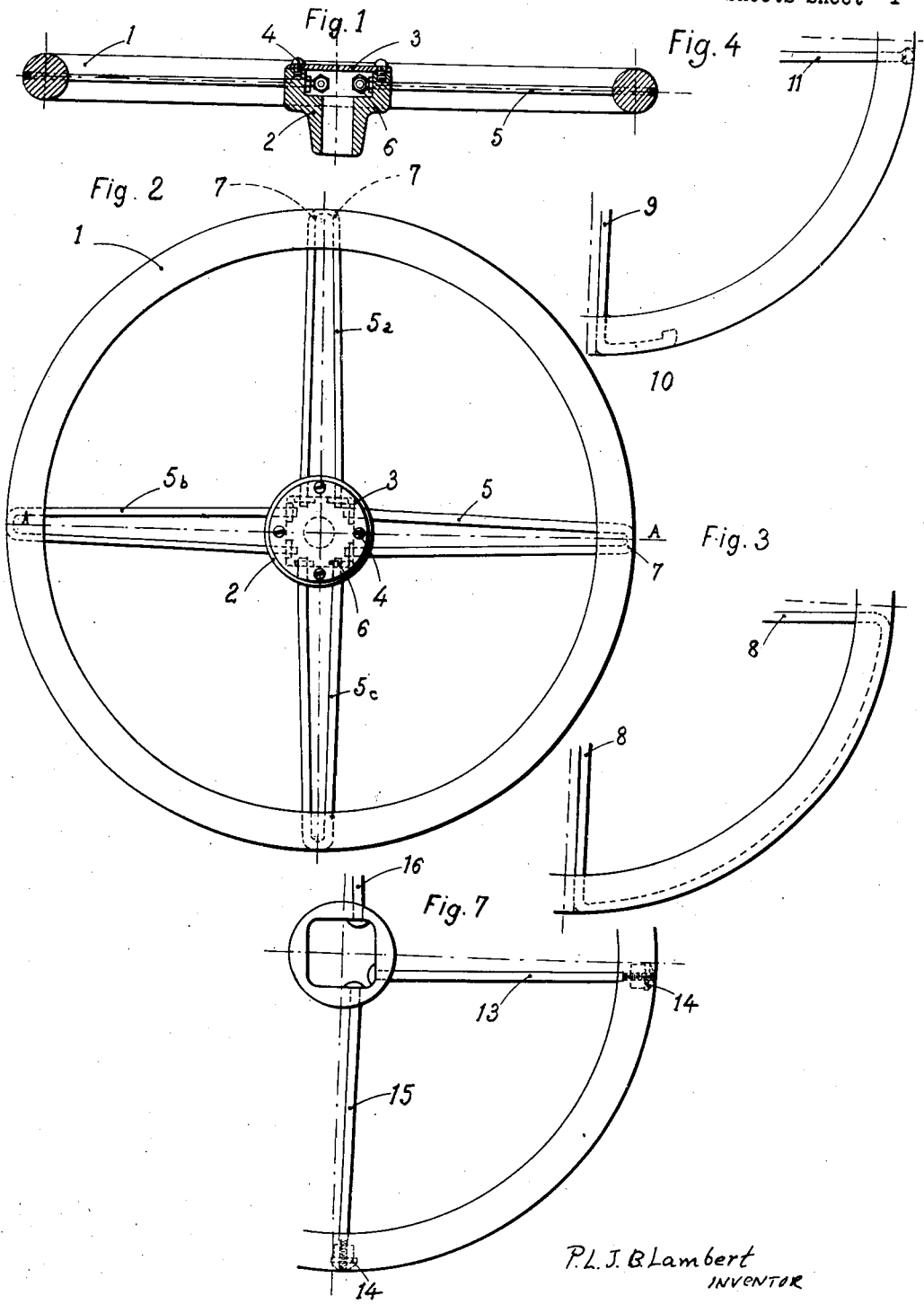

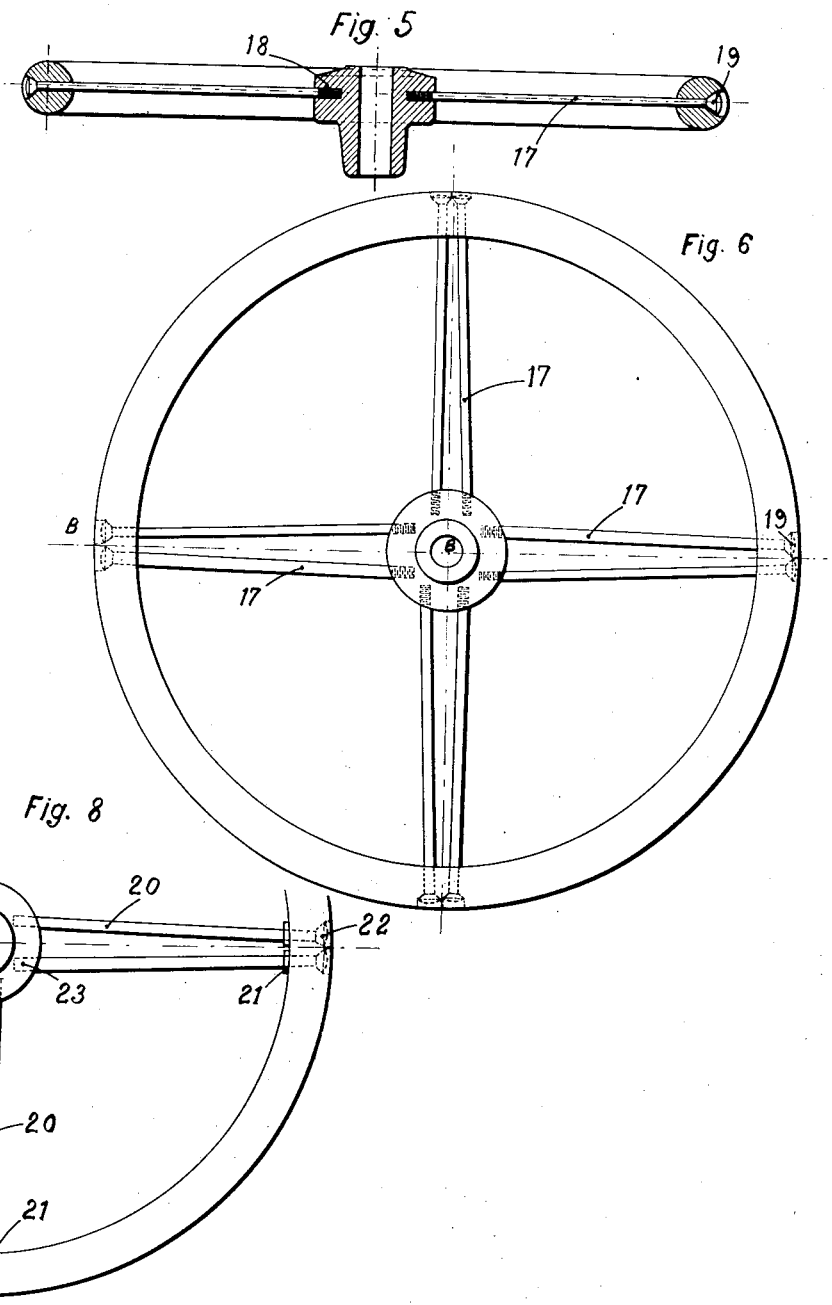

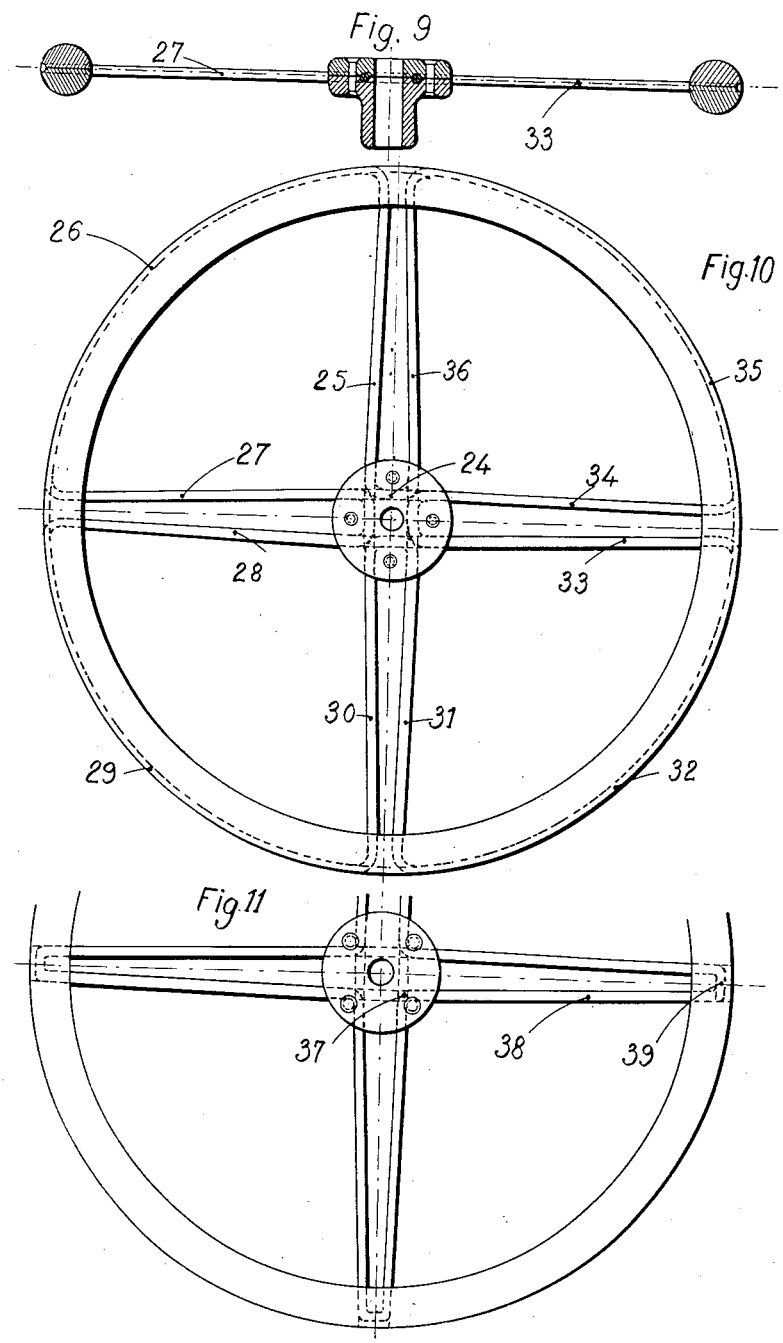

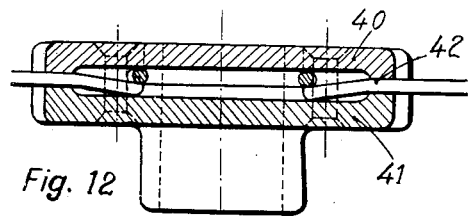
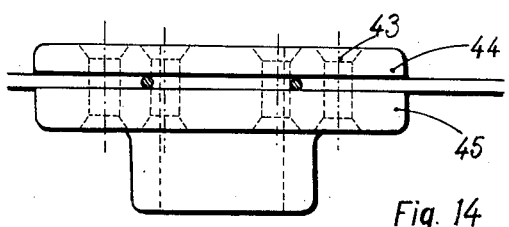
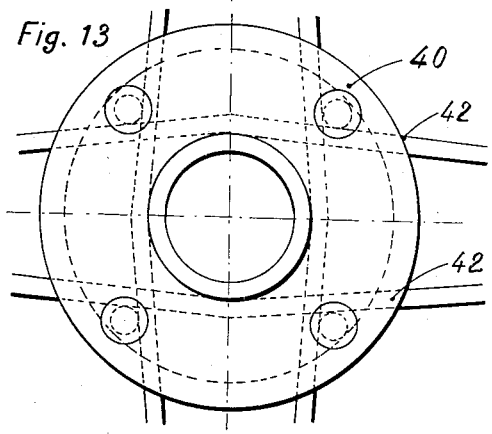
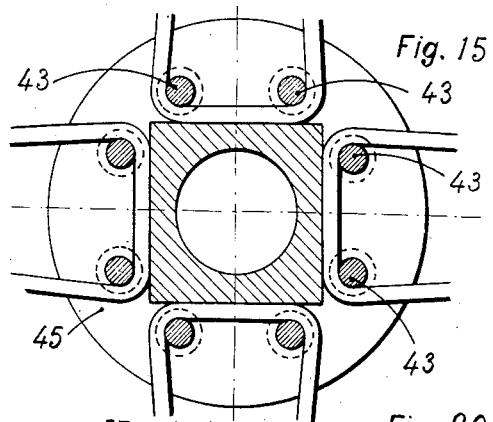
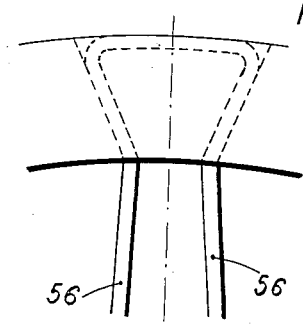
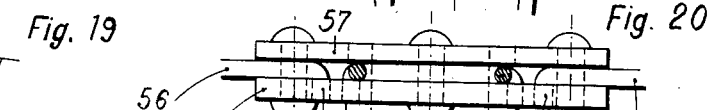
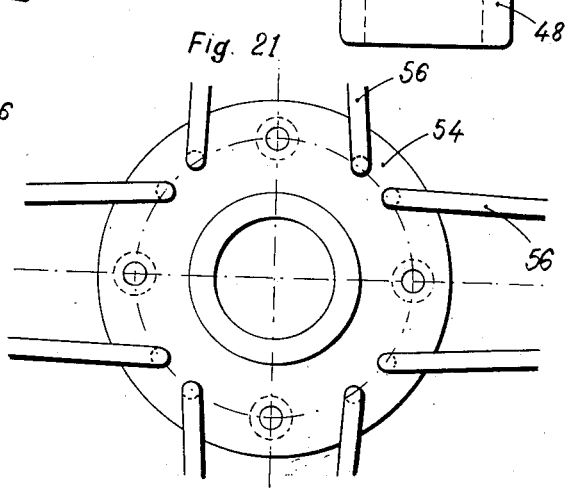

1,720,737

UNITED STATES PATENT OFFICE.

PIERRE LOUIS JEAN BAPTISTE LAMBERT, OF VANVES, FRANCE.

STEERING WHEEL.

Application filed April 12, 1926, Serial No. 101,513, and in France May 1, 1925.

My invention relates to steering wheels for motor vehicles, wherein an improved construction for such wheels is afforded.

In the known steering wheels, the device usually comprises a hub, spokes which are cast or pressed together, and a wheel rim. Wheels have already been made of sheet metal whereby a certain elasticity is afforded, but the cost of such devices is still high. Designs for elastic wheels are made complicated by the fact that the wheel must be quite rigid in the plane of its rotation, while being subjected to deformation in the axial direction.

I am enabled to attain this result in an approved manner by the use of the steering wheel according to my said invention, wherein the spokes connecting the wheel rim with the hub consist of metallic rods, and particularly of spring steel wires of suitable section which are situated in a common plane, i. e. the plane of rotation of the flywheel. I may vary the number and the disposition of the said rods or wires, as disclosed in the constructions to be further specified, and the said rods or wires may be provided with clamping means whereby the rigidity of the wheel in its plane of rotation may be regulated without prejudice to its elasticity in the direction of its axis. The hub and the wheel rim may consist of one or more members of metal, wood, or cast or moulded material formed before or after the assembling of the several parts of the steering wheel. I may further modify the said wheel in any suitable manner according to its use.

The appended drawings show various constructions of the steering wheel according to the invention.

Fig. 1 shows a construction of the wheel, partly in elevation and partly in section on the line A—A of Fig. 2, and Fig. 2 is the corresponding plan view.

Figs. 3 and 4 show two other embodiments in plan view.

Fig. 5 shows another construction of the steering wheel partly in elevation and partly in section on the line B—B—B of Fig. 6, and Fig. 6 is the corresponding plan view.

Figs. 7 and 8 are plan views of other constructional forms of the wheel spokes.

Figs. 9 and 10 show different constructions of the wheel spokes by the use of a single wire. Figs. 12 to 21 show different methods of mounting the arms within the hub. Figs. 22 to 25 relate chiefly to the mounting of the spokes upon the wheel rim.

In Fig. 1, 1 is the wheel rim which consists of a torus of wood or the like and is connected with the hub 2 by the four arms 5 5$^a$ 5$^b$ 5$^c$ which are situated in a common plane, each arm consisting of two branches of steel wire. The forked members thus obtained are disposed at one end in recesses formed for the purpose in the wheel rim, and at the other end in a recess provided in the hub 2 and having a polygonal section whose number of sides corresponds to the number of arms employed. It will thus have a square section in the device shown in the figure which has four arms, but for a wheel with three arms it would be triangular. The steel rods 5 5$^a$ 5$^b$ 5$^c$ are held as well as stretched by the nuts or rivets 6 disposed on their ends situated in the recess in the hub. With the use of rivets, the stretching of the rods cannot be changed. As regards the attaching of the said rods, I may invert the functions of the wheel rim and the hub, the rods being first mounted in the hub and then secured to the rim.

Upon the hub 2 is placed the cover plate 3 which is attached thereto for instance by the screws 4 and conceals the internal arrangement.

In Fig. 3, the steel wire 8 may pass around a portion of the rim, it being then attached within the hub in the same manner as shown in Figs. 1 and 2. For a wheel with four arms, the rim is maintained by four similar sector-shaped wire elements.

In Fig. 4, the arms consist of the single rods 9 or 11 which end within the wheel rim either in a suitable head, as in the case of the rod 11, or in an elbow 10, for the rod 9, the said rods being held within the hub as shown in Figs. 1 and 2. As concerns the attaching of the rods, the functions of the rim and the hub may also be inverted.

In Fig. 5, which is a section on the line B—B—B of Figure 6, the steel rods 17 which are either single or double, carry a head 19 mounted in the rim, and are screwed directly into the hub 18.

In Fig. 7, the spokes such as 13, 15, 16 are first inserted through the hub and are then secured to the rim by the nuts 14. The dot-and-dash lines show a single bent rod which can be substituted for the pair of spokes 13 and 15. The wheel which comprises four arms will in this case employ four bent rods. The spokes 15—16 might be replaced by a single rod extending from a given point on the wheel to a diametrically opposite point, simply traversing the hub. The rods used in Fig. 7 might even be imbedded in the hub during the casting process, where a cast hub is employed.

Fig 8 shows a device having marked advantages and enabling a very flexible construction for the wheel; herein the arms consist of the rods 20—single or double—carrying at one end suitable heads or nuts 22 as well as a screwthread cooperating with the nuts 21, for tightening the said nuts against the rim. The rods 20 are smooth at the other end and engage in a corresponding recess 23 in the hub, in which they may slide if necessary. The functions of the hub and the rim may also be inverted, and a like flexibility for the wheel is offered in both cases. The deformations are no longer limited by the tension of the spokes as in the preceding devices, and this will much increase the elasticity of the wheel.

As shown in Figs. 9, 10 and 11, the spokes of the wheel may consist of a single steel wire suitably disposed.

In Figs. 9 and 10, this single wire starts from the hub at 24, proceeds by way of 25, is curved at 26, returns at 27, and then passes through the hub, continuing thence by way of 28—29—30—31—32—33—34—35—36, thus forming the spokes, and returning to the point 24; herein the hub is made of two connected parts and comprises recesses for the insertion of the wire. I prefer to make the wheel rim in two or more parts, or further, of a cast or molded substance, so that the wire spoke element or spider can be constructed before mounting it on the wheel, as this mounting would prove difficult were the single wire to be bent along its path in the rim and the hub.

In the device shown in Fig. 11, which is a modification of the preceding, the single wire starts from 37, proceeds at 38, forms a loop 39 and thus continues until it returns to the point 37; herein the single wire, instead of being mounted as in the preceding case by giving it about a 90 degree arc when in the wheel rim, covers a relatively small part of the rim.

Figs. 12 to 21 relate more particularly to the arrangement of the strands of wires forming the arms in the parts within the hub.

In Figs. 12 and 13, the wires are crossed about the center of the hub and are secured to the rim by one of the means above disclosed or to be further mentioned; herein the wire is held between the two parts 40 and 41 of the hub, each of which comprise at the periphery suitable apertures 42 for the insertion of the wire.

As shown in Figs. 14 and 15, the spokes consist of the wires 15 and 16 which are bent into a U shape and are held in the hub by pins or rivets 43; in this manner the several strands are maintained after the two parts 44—45 of the hub. The rim is disposed according to one of the means above described or to be further disclosed.

In Fig. 16, the wire is not bent into a U shape but has loops 46 formed at the ends, for the insertion of the pins or rivets serving to unite the two parts of the hub.

In the particularly simple device shown in Figs. 17 and 18, the hub is still made in two parts, 47—48. In the part 48 are the recesses 52 having the form of a slot whose width corresponds to the diameter of the wire and having a suitable height, and I pierce perpendicularly to the axis of the said slots suitable holes for the insertion of the axles 49 which are secured by riveting or by the small pins. The end of each wire is bent into a hook 53, and it is thus very flexible while at the same time it is securely held in the hub, since the lower face of the strand 50 is free to move, and the hook 53 serves solely to arrest the strand and to add to the force of the spring formed at 50. I may obviously replace the hook 53 by a loop, and the slots 52 by simple holes. The spokes may form loops where disposed in the rim (Fig. 11) and their ends may be turned as shown at 24, Fig. 10, i. e. the hooks 53 instead of being vertical will now be horizontal, and this will simplify the cutting of the hub.

In a modification of the preceding device (Figs. 20 and 21) the member 48 of the hub has a flanged part 54 pierced with vertical holes 55 in which are engaged the vertical ends of the horizontal arms 56 which are herein bent into a U shape.

The part 47 (Fig. 17) now has the form of a disk which is secured to the said flanged part by bolts or rivets. The holes 55 might be replaced by a circular groove 55' in the concentric position on the hub (Fig. 21ª). The arms are secured to the wheel rim by one of the means above disclosed.

I may secure the spokes to the wheel rim, as is shown in Fig. 19 for the spoke 56¹, by the use of the recess whose active surfaces are inclined, or as shown in Figs. 22 and 23 by means of a pin or a rivet 58 and a recess 59 which is preliminarily milled in the wheel rim; this latter may optionally consist of two or more parts, or as shown in Figs. 24 and 25 I may simply employ a screw 60 inserted in the loop 61 which is formed at the end of the said spokes.

In all of the aforesaid devices, the question relates solely to the mounting of the spokes, and obviously the wires or rods forming the said spokes might be provided with a suitable covering, either by coating the individual wires, or in the case of spokes consisting of a pair of metal wires or rods, by sheet metal members placed between the said wires or rods, so that the steering wheel will have an attractive appearance.

Claims:

1. A steering whel for vehicles comprising a hub member having an annular spoke receiving portion, a rim member positioned in the plane of the annular receiving portion, a plurality of straight spring steel wire spokes radially arranged between the members and situated in the same plane all of the wire spring spokes being situated in the same plane, one of the ends of each of said spokes being interengaged with one of said first mentioned members, and means for anchoring the opposite ends of each of the spokes to the other of said first mentioned members.

2. A steering wheel for vehicles comprising a hub member, a rim member, a plurality of spokes radially arranged between and in the same plane as the hub and rim members and each formed from a single piece of spring steel wire bent upon itself to provide multiple arms, the intermediate portion of each of said spokes being interengaged with one of said first mentioned members, and means for anchoring the remaining ends of said multiple arms to the other of said first mentioned members.

3. A steering wheel for vehicles comprising a two part hub member, a rim member, a plurality of spokes radially arranged between the hub and rim and situated in the same plane thereof, and each of said spokes consisting of single pieces of spring steel wire bent upon itself to provide duplex arms the intermediate portion of each arm being interengaged with the rim member, and the free ends of said arm being anchored within the two part hub member.

4. A steering wheel for vehicles as claimed in claim 3, wherein the rim member is provided with a plurality of substantially U-shaped passageways opening toward the hub for accommodating the intermediate portion of each of the duplex arms.

5. A steering wheel for vehicles as claimed in claim 3, wherein the rim member is provided with a plurality of substantially U-shaped passageways opening toward the hub member while the sides of the passageways are arranged in divergent relation radially of the wheel, and wherein the intermediate portions of each of the duplex arms is passed similarly to the passageways for interengagement therewith, substantially as and for the purposes set forth.

In testimony whereof I affix my signature.

PIERRE LOUIS JEAN BAPTISTE LAMBERT.